(12) United States Patent
Vawter

(10) Patent No.: US 8,582,931 B1
(45) Date of Patent: Nov. 12, 2013

(54) OPTICAL XOR GATE

(75) Inventor: G. Allen Vawter, Corrales, NM (US)

(73) Assignee: Sandia Corporation, Albuquerque, NM (US)

( * ) Notice: Subject to any disclaimer, the term of this patent is extended or adjusted under 35 U.S.C. 154(b) by 485 days.

(21) Appl. No.: 12/973,470

(22) Filed: Dec. 20, 2010

(51) Int. Cl.
*G02B 6/12* (2006.01)
(52) U.S. Cl.
USPC ............. 385/14; 385/1; 385/2; 385/3; 385/24
(58) Field of Classification Search
None
See application file for complete search history.

(56) References Cited

U.S. PATENT DOCUMENTS 7,787,719 B1 * 8/2010 Vawter ............................ 385/14

OTHER PUBLICATIONS

Electronic Letters, R.P. Webb et al, 40 Gbit/s All-Optical XOR Gate Based Nn Hybrid-Integrated Mach-Zehnder Interferometer, Jan. 9, 2003, p. 79-81, vol. 39 No. 1.
Journal of Lightwave Technology, Chris Bintjas et al, Ultrafast Nonlinear Interferometer (UNI)-Based Digital Optical Circuits and Their Use in Packet Switching, Nov. 2003, p. 2629-2637, vol. 21, No. 11.
IEEE Journal of Quantum Electronics, Qiang Wang et al, Study of All-Optical XOR Using Mach-Zehnder Interferometer and Differential Scheme, Jun. 2004, p. 703-709, vol. 40, No. 6.
IEEE Journal of Selected Topics in Quantum Electronics, Erik J. Skogen et al, Monolithically Intergrated Active Components: A Quantum-Well Intermixing Approach, Mar./Apr. 2005, p. 343-355, vol. 11, No. 2.
IEEE Optical Communications, Min Zhang et al, All Optical XOR Logic Gates: Technologies and Experiment Demonstrations, May 2005, p. S19-S24.
Electronic Letters, J. H. Lee et al, 40 Gbit/s XOR and and Gates Using Polarisation Switching Within 1 m-long Bismuth Oxide-Based Nonlinear Fibre, Sep. 15, 2005, vol. 41 No. 19.
Electronic Letters, R.P. Webb et al, All-Optical 40 Gbit/s XOR Gate With Dual Ultrafast Nonlinear Interferometer, Dec. 8, 2005, vol. 41 No. 25.
Optics Communications 262 (2006) 32-37, W. B. Fraga et al, All Optical Gates Based on an Asymmetric Nonlinear Directional Coupler.
IEEE Photonics Technology Letters, Zhihong Li et al, Ultrahigh-Speed Reconfigurable Logic Gates Based on Four-Wave Mixing in a Semiconductor Optical Amplifier, pp. 1341-1343, vol. 18, No. 12, Jun. 15, 2006.
IEEE Journal of Quantum Electronics, James W. Raring et al, Design and Demonstration of Novel QW Intermixing Scheme for the Integration of UTC-Type Photodiodes With QW-Based Components, pp. 171-181, vol. 42, No. 2, Feb. 2006.
IEEE Journal of Quantum Electronics, Hongzhi Sun et al, All-Optical Logic XOR Gate At 80 Gb/s Using SOA-MZI-DI, pp. 747-751, vol. 42, No. 8, Aug. 2006.
Journal of Lightwave Technology, Joo-Youp Kim et al, All-Optical Multiple Logic Gates With XOR, NOR, OR, and NAND Functions Using Parallel SOA-MZI Structures: Theory and Experiment, pp. 3392-3399, vol. 24, No. 9, Sep. 2006.

(Continued)

*Primary Examiner* — Uyen Chau N Le
*Assistant Examiner* — Chad Smith
(74) *Attorney, Agent, or Firm* — Martin I. Finston

(57) ABSTRACT

An optical XOR gate is formed as a photonic integrated circuit (PIC) from two sets of optical waveguide devices on a substrate, with each set of the optical waveguide devices including an electroabsorption modulator electrically connected in series with a waveguide photodetector. The optical XOR gate utilizes two digital optical inputs to generate an XOR function digital optical output. The optical XOR gate can be formed from III-V compound semiconductor layers which are epitaxially deposited on a III-V compound semiconductor substrate, and operates at a wavelength in the range of 0.8-2.0 μm.

19 Claims, 6 Drawing Sheets

(56) References Cited

OTHER PUBLICATIONS

Proceedings of the 3rd IEEE International Conference Group IV Photronics, P. Sanchis et al, All-Optical MZI XOR Logic Gate Based on Si Slot Waveguides Filled by Si-nc Embedded in SiO2, pp. 81-83, Oct. 9, 2006.

IEEE Journal of Selected Topics in Quantum Electronics, James W. Raring et al, 40-Gb/s Widely Tunable Transceivers, pp. 3-14, vol. 13, No. 1, Jan./Feb. 2007.

IEEE Photonics Technology Letters, J, M. Martinez et al, All-Optical Processing Based on a Logic XOR Gate and a Flip-Flop Memory for Packet-Switched Networks, pp. 1316-1318, vol. 19, No. 17, Sep. 1, 2007.

Journal of Optics A: Pure and Applied Optics, Jian Wang et al, Simple Realization of All-Optical High-Speed (40, 80 and 160 Gbs-1) XOR and OR Logic Gates Using LiNbO3 Waveguides, pp. 811-819, 1464-4258/07/100811+09$30.00 2007 IOP Publishing Ltd.

UKR. J. Phys. Opt. 2008, V9, No. 3, Dzedolik I. V., et al, All-Optical Logic Gates Based on Nonlinear Dielectric Films, pp. 187-196.

Optics Letters, Jian Wang et al, Ultrafast All-Optical Three-Input Boolean XOR Operation for Differential Phase-Shift Keying Signals Using Periodically Poled Lithium Niobate, pp. 1419-1421, vol. 33, No. 13.

Optical Engineering, Ofer Limon et al, Nanophotonic Interferometer Realizing All-Optical Exclusive or Gate on a Silicon Chip, pp. 064601-1 through 064601-4, Jun. 2009/vol. 48(6).

Optics Communications 282 (2009) 2615-2619, Jian Wang et al, Experimental Demonstration on 40 Gbit/S All-Optical Multicasting Logic XOR Gate for NRZ-DPSK Signals Using Four-Wave Mixing in Highly Nonlinear Fiber.

Optics Letters, Lei Zhang et al, Demonstration of Directed XOR/XNOR Logic Gates Using Two Cascaded Microring Resonators, pp. 1620-1622, vol. 35, No. 10, May 15, 2010.

Presented at the Photonics in Switching 2010 Conference, Monterrey, CA, Jul. 25-29, 2010, Erik J. Skogen at al, Optical Logic Gates Using Interconnected Photodiodes and Electro-Absorption Modulators, 3 page .pdf, OSA/IPR/PS 2010.

* cited by examiner

| "A" Input | "B" Input | A$\bar{B}$ | $\bar{A}$B | XOR Output |
|---|---|---|---|---|
| "0" | "0" | "0" | "0" | "0" |
| "1" | "0" | "1" | "0" | "1" |
| "0" | "1" | "0" | "1" | "1" |
| "1" | "1" | "0" | "0" | "0" |

OPTICAL XOR GATE

GOVERNMENT RIGHTS

This invention was made with Government support under Contract No. DE-AC04-94AL85000 awarded by the U.S. Department of Energy. The Government has certain rights in the invention.

CROSS REFERENCE TO RELATED APPLICATIONS

The present application is related to U.S. patent application Ser. No. 12/182,683, entitled "Optical NAND Gate," of common assignee filed on Jul. 30, 2008, and to U.S. patent application Ser. No. 12/270,221, entitled "Optical NOR Gate," of common assignee filed on Nov. 13, 2008. The contents of both of these patent applications are incorporated herein by reference in their entirety.

FIELD OF THE INVENTION

The present invention relates in general to digital optical logic gates, and in particular to a optical XOR (exclusive or) gate which utilizes electroabsorption modulators and waveguide photodetectors to generate an XOR function digital optical output from a pair of digital optical inputs.

BACKGROUND OF THE INVENTION

Optical logic gates have been the subject of research for several decades due to the possibility of achieving higher operating speeds than logic based on electronics. The advantages of digital signal processing in the optical domain include higher signal bandwidth, lower signal cross-talk, and greater protection against electronic eavesdropping. All-optical signal processing also eliminates the need to convert signals from the optical domain into the electronic domain for processing and then to re-convert the processed signals from the electronic domain back into the optical domain. All-optical signal processing is advantageous to reduce the cost, electrical power requirement, size and weight compared to optical-to-electronic converters, electronic signal processing circuitry, and electronic-to-optical converters which are currently being used.

The present invention addresses the need for optical logic gates by providing an optical exclusive or (also termed XOR) gate which can be formed as a photonic integrated circuit (PIC) using two electroabsorption modulator (EAM) photodiode (PD) pairs, with each EAM/PD pair being electrically connected together in series. This configuration according to the present invention provides advantages in terms of optical isolation of input and output signals, an ability to be monolithically integrated, and an ability to operate using direct-current electrical power sources with a relatively low power consumption and a relatively compact size. The present invention is also advantageous in providing for optical signal gain and regeneration thereby permitting a fan out capability which can allow multiple optical XOR gates to be interconnected together or to be interconnected to the optical logic gates disclosed in U.S. patent application Ser. Nos. 12/182,683 and 12/270,221 and to an optical data latch disclosed in U.S. Pat. No. 7,787,719 to provide a high level of logic functionality for optical signal processing or optical computing applications.

These and other advantages of the present invention will become evident to those skilled in the art.

SUMMARY OF THE INVENTION

The present invention relates to a photonic integrated circuit (PIC) which generates an exclusive or (i.e. XOR) function digital optical output (also referred to herein as an XOR function output or simply an XOR output) from a pair of digital optical inputs. The PIC (also referred to herein as an optical XOR gate or simply an XOR gate) comprises a substrate with two sets of optical waveguide devices formed on the substrate.

A first set of the optical waveguide devices comprises a first electroabsorption modulator and a first photodetector which are electrically connected together in series. The first electroabsorption modulator receives a first light portion split out from a first digital optical input (referred to herein as an "A" input) of the pair of digital optical inputs by a first optical waveguide splitter located on the substrate. The first photodetector receives a second light portion split out from a second digital optical input (referred to herein as a "B" input) of the pair of digital optical inputs by a second optical waveguide splitter located on the substrate. The first photodetector generates a photocurrent signal from the second light portion, with the photocurrent signal being used to change a reverse-bias voltage on the first electroabsorption modulator, thereby generating a first inverted AND function output from the first light portion.

A second set of the optical waveguide devices on the substrate comprises a second electroabsorption modulator and a second photodetector which are electrically connected together in series. The second electroabsorption modulator receives a third light portion split out from the second digital optical input (i.e. the "B" input) by the second optical waveguide splitter; and the second photodetector receives a fourth light portion split out from the first digital optical input (i.e. the "A" input) by the first optical waveguide splitter. The second photodetector generates another photocurrent signal from the fourth light portion, with this photocurrent signal being used to change the reverse-bias voltage on the second electroabsorption modulator, thereby generating a second inverted AND function output from the third light portion. An optical combiner, which can be located either on the substrate or off the substrate, can then be used to combine the first and second inverted AND function outputs to form the XOR function digital optical output.

The optical XOR gate can include a first resistor which is electrically connected from an anode side of the first electroabsorption modulator to ground, and a second resistor which is electrically connected from the anode side of the second electroabsorption modulator to ground.

The first and second digital optical inputs can have a wavelength in the range of 0.8-2.0 microns, with the XOR function digital optical output also being in this same wavelength range.

One or more semiconductor optical amplifiers (SOAs) can be optionally provided on the substrate to amplify at least one of the optical signals used in the PIC. These optical signals include the first digital optical input (i.e. the "A" input), the second digital optical input (i.e. the "B" input), the first light portion, the second light portion, the third light portion, the fourth light portion, and the XOR function digital optical output.

A plurality of optical waveguides are provided on the substrate to guide the first light portion from the first optical waveguide splitter to the first electroabsorption modulator, to guide the second light portion from the second optical waveguide splitter to the first photodetector, to guide the third light portion from the first optical waveguide splitter to the second electroabsorption modulator, and to guide the fourth light portion from the first optical waveguide splitter to the second photodetector.

The substrate can comprise a III-V compound semiconductor substrate, and each electroabsorption modulator and each photodetector can comprise a plurality of III-V compound semiconductor layers which are epitaxially grown on the III-V compound semiconductor substrate.

In certain embodiments of the present invention, the III-V compound semiconductor substrate can comprise indium phosphide (InP); and the plurality of III-V compound semiconductor layers can be selected from the group consisting of indium gallium arsenide phosphide (InGaAsP) layers, indium gallium arsenide (InGaAs) layers, indium aluminum gallium arsenide (InAlGaAs) layers, and combinations thereof. In other embodiments of the present invention, the III-V compound semiconductor substrate can comprise gallium arsenide (GaAs); and the plurality of III-V compound semiconductor layers can be selected from the group consisting of GaAs layers, aluminum gallium arsenide (AlGaAs) layers, InGaAsP layers, InGaAs layers, and combinations thereof.

The present invention also relates to an optical XOR gate which receives a first digital optical input (i.e. an "A" input) and a second digital optical input (i.e. a "B" input) and generates therefrom an XOR function digital optical output. The optical XOR gate can comprise a III-V compound semiconductor substrate with a plurality of III-V compound semiconductor layers epitaxially grown thereon. A first electroabsorption modulator is formed from the plurality of III-V compound semiconductor layers, with the first electroabsorption modulator receiving a first light portion of the first digital optical input (i.e. the "A" input). A first waveguide photodetector is also formed from the plurality of III-V compound semiconductor layers, with the first waveguide photodetector receiving a second light portion of the second digital optical input (i.e. the "B" input) and generating from the second light portion a first photocurrent signal which is used to change an absorption of light in the first electroabsorption modulator, thereby modulating the first light portion being transmitted through the first electroabsorption modulator to provide a first digitally-modulated output (also referred to herein as a first inverted AND function output) from the first electroabsorption modulator. A second electroabsorption modulator is also formed from the plurality of III-V compound semiconductor layers, with the second electroabsorption modulator receiving a third light portion of the second digital optical input (i.e. the "B" input). A second waveguide photodetector is formed from the plurality of III-V compound semiconductor layers and receives a fourth light portion of the first digital optical input (i.e. the "A" input) and uses the fourth light portion to generate a second photocurrent signal. This second photocurrent signal is used to change the absorption of light in the second electroabsorption modulator, thereby modulating the third light portion being transmitted through the second electroabsorption modulator to provide a second digitally-modulated output (also referred to herein as a second inverted AND function output) from the second electroabsorption modulator. The first and second digitally-modulated outputs can then be combined in an optical waveguide combiner to generate the XOR function digital optical output.

The first electroabsorption modulator and the first waveguide photodetector can be electrically connected in series, and the second electroabsorption modulator and the second waveguide photodetector can also be electrically connected in series.

A first resistor can be electrically connected from an anode side of the first electroabsorption modulator to ground, and a second resistor can be electrically connected from the anode side of the second electroabsorption modulator to ground.

The first and third light portions can be generated from the first digital optical input (i.e. the "A" input) using a first optical waveguide splitter which is formed from the plurality of III-V compound semiconductor layers. The second and fourth light portions can also be generated from the second digital optical input (i.e. the "B" input) using a second optical waveguide splitter which can also be formed from the plurality of III-V compound semiconductor layers. The optical waveguide combiner can also be formed from the plurality of III-V compound semiconductor layers.

The first and second digital optical inputs can have a wavelength in the range of 0.8-2.0 microns; and the XOR function digital optical output can also have a wavelength in this same range.

In some embodiments of the present invention, the III-V compound semiconductor substrate can comprise indium phosphide (InP); and the plurality of III-V compound semiconductor layers can be selected from the group consisting of indium gallium arsenide phosphide (InGaAsP) layers, indium gallium arsenide (InGaAs) layers, indium aluminum gallium arsenide (InAlGaAs) layers, and combinations thereof. In other embodiments of the present invention, the III-V compound semiconductor substrate can comprise gallium arsenide (GaAs); and the plurality of III-V compound semiconductor layers can be selected from the group consisting of GaAs layers, aluminum gallium arsenide (AlGaAs) layers, InGaAsP layers, InGaAs layers, and combinations thereof.

A plurality of passive optical waveguides (also referred to as optical waveguides) can also be formed from the plurality of III-V compound semiconductor layers. These passive optical waveguides can be used to guide the first light portion to the first electroabsorption modulator, to guide the second light portion to the first photodetector, to guide the third light portion to the second electroabsorption modulator, and to guide the fourth light portion to the second photodetector.

One or more semiconductor optical amplifiers (SOAs) can also be optionally formed from the plurality of III-V compound semiconductor layers. These SOAs can be used to amplify optical signals including the first digital optical input (i.e. the "A" input), the second digital optical input (i.e. the "B" input), the first light portion, the second light portion, the third light portion, the fourth light portion and the XOR function digital optical output.

Additional advantages and novel features of the invention will become apparent to those skilled in the art upon examination of the following detailed description thereof when considered in conjunction with the accompanying drawings. The advantages of the invention can be realized and attained by means of the instrumentalities and combinations particularly pointed out in the appended claims.

BRIEF DESCRIPTION OF THE DRAWINGS

The accompanying drawings, which are incorporated into and form a part of the specification, illustrate several aspects of the present invention and, together with the description, serve to explain the principles of the invention. The drawings are only for the purpose of illustrating preferred embodiments of the invention and are not to be construed as limiting the invention. In the drawings:

FIGS. 3A-3G are taken along the section line 1-1 in FIG. 1; and FIG. 3H is taken along the section line 2-2 in FIG. 1.

DETAILED DESCRIPTION OF THE INVENTION

Figure 1:
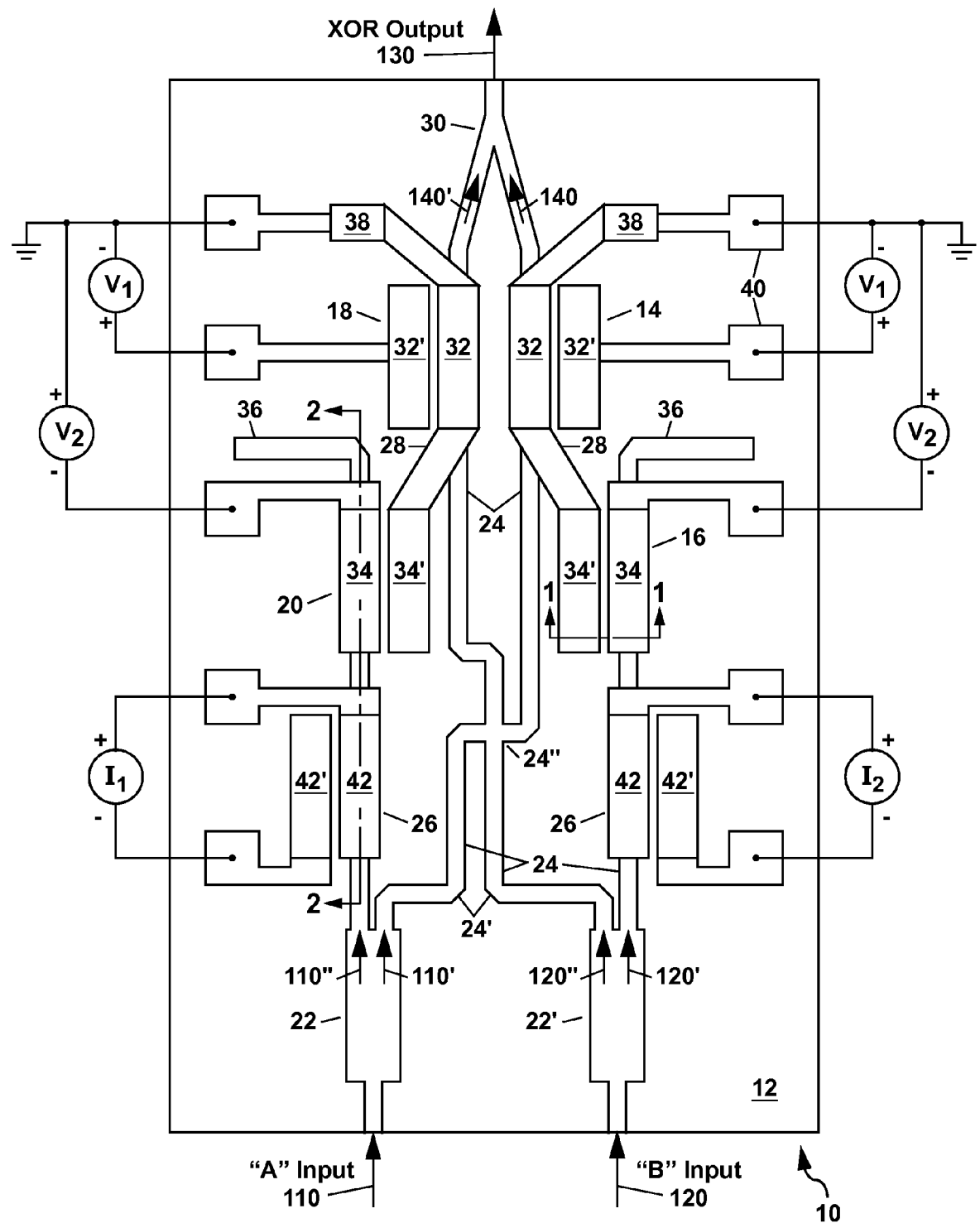
FIG. 1 shows a schematic plan view of an example of the optical XOR gate of the present invention.
Figures 2A, 2B:
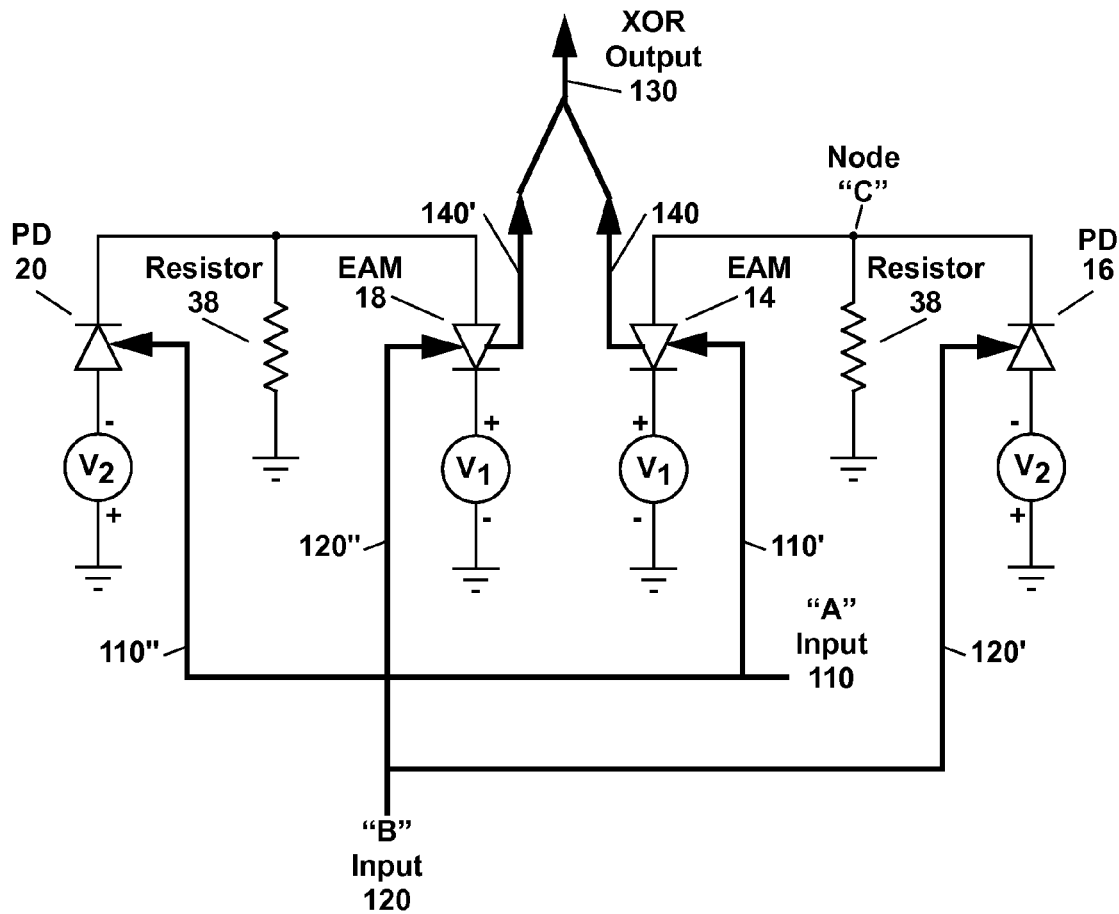
FIG. 2A shows a schematic diagram of the electrical and optical circuit for the optical XOR gate of FIG. 1 with the optional semiconductor optical amplifer omitted.
FIG. 2B shows a logical truth table for the optical XOR gate of FIG. 1.

Referring to FIG. 1, there is shown a schematic plan view of an example of the optical XOR gate 10 of the present invention which can be formed as a photonic integrated circuit (PIC). FIG. 2A shows a schematic diagram of the electrical and optical circuit for the optical XOR gate 10 of FIG. 1; and FIG. 2B shows a logical truth table for the optical XOR gate of FIG. 1.

The optical XOR gate 10 comprises a substrate 12 on which are formed a first waveguide electroabsorption modulator (EAM) 14 and a first waveguide photodetector (PD) 16 which are electrically connected together in series with a cathode side of the PD 16 being connected to an anode side of the EAM 14 as shown in FIG. 2A. A second waveguide EAM 18 and a second waveguide PD 20 are also provided on the substrate 12 and are electrically connected together in series with the cathode side of the PD 20 being connected to the anode side of the EAM 18 as shown in FIG. 2A. Each waveguide electroabsorption modulator 14, 18 and each waveguide photodetector 16, 20 can be formed either as a lumped-element device, or as a traveling-wave device.

In FIGS. 1 and 2A, a first digital optical input 110 termed an "A" input and a second digital optical input 120 termed a "B" input are coupled into the optical XOR gate 10, with the optical XOR gate 10 then using the "A" and "B" inputs to generate an XOR function digital optical output 130 (also referred to as an XOR output) according to the truth table of FIG. 2B. Each digital optical input 110 and 120 can comprise a stream of digital optical data which can be coupled into the optical XOR gate 10 from an optical fiber (e.g. when the optical XOR gate 10 is formed as a stand-alone device) or an optical waveguide (e.g. when the optical XOR gate 10 is integrated with other optical logic gates on a common substrate 12). The XOR function digital optical output 130 can also be coupled out of the XOR gate 10 using an optical fiber or an optical waveguide.

In discussing the operation of the optical XOR gate 10 of the present invention hereinafter a logical "1" state will correspond to a relatively high level of light being present at the "A" or "B" input or the XOR output at a particular instant in time (e.g. during a clock cycle); and a logical "0" state will correspond to the absence of light or a low level of light being present at the "A" or "B" input or the XOR output. Those skilled in the art know that this convention for assigning light levels to the logical "1" and "0" states is arbitrary and can be reversed.

In FIG. 1, the "A" input 110 is coupled into an optical waveguide splitter 22 (also termed an optical coupler) which splits (i.e. divides) the "A" input 110 into two light portions designated herein as a first light portion 110' and a fourth light portion 110". These two light portions can be equal in light intensity or unequal in light intensity depending upon a particular embodiment of the present invention. Similarly, the "B" input 120 is coupled into another optical waveguide splitter 22' which splits the "B" input 120 into two light portions designated as a second light portion 120' and a third light portion 120". Each optical waveguide splitter 22 and 22' can be formed using branching waveguide Y-junctions, or as a multimode interference coupler (also termed a MMI coupler) as shown in the example of FIG. 1. Both of these types of optical couplers are well known in the art and need not be described herein in detail.

Each light portion 110', 110", 120' and 120" can be coupled out of one of the optical waveguide splitters 22, 22' and into an optical waveguide 24. The first light portion 110' can be guided in one of the optical waveguides 24 to the first EAM 14; and the second light portion 120' can be guided through another of the optical waveguides 24 to the first PD 16. Similarly the third light portion 120" can be guided by yet another optical waveguide 24 to the second EAM 18; and the fourth light portion 110" can be guided by still another optical waveguide 24 to the second PD 20. The optical waveguides 24 can include 90° turning mirrors 24' and a waveguide crossing 24" for guiding the light portions 110' and 120" and for providing substantially equal optical paths between the optical waveguide splitters 22 and 22' and the EAMs 14 and 18 to maintain a relative timing for the light portions 110' and 120".

In the example of FIG. 1 a semiconductor optical amplifier (SOA) 26 is provided in the optical path of the second light portion 120' for amplification prior to guiding the second light portion 120' to the first PD 16. Similarly, another SOA 26 is provided in the optical path of the fourth light portion 110" to amplify the light portion 110" prior to the second PD 20. These SOAs 26 are optional depending upon the intensity of the light in the portions 110" and 120'. In the example of FIG. 1, the SOAs 26 can amplify the light portions 110" and 120' to provide larger photocurrent signals from the PDs 16 and 20 upon detection of the light in the portions 110" and 120' and thereby provide a larger on/off contrast for the light portions 110' and 120" being transmitted through the EAMs 14 and 18 and combined to form the XOR output 130. If needed, additional SOAs 26 can also be provided in other locations in the optical XOR gate 10, for example, to amplify the first and third light portions, or to amplify the "A" and "B" inputs prior to the optical waveguide splitters 22, 22', or to amplify the output from each EAM 14, 18 or the XOR output 130. Thus, according to the present invention, SOAs 26 can be provided at any location in the optical XOR gate 10 where an optical signal needs to be amplified or to be restored to a predetermined light level (e.g. to provide a substantially uniform light level for a logical "1" state when a plurality of XOR gates 10 are connected together, or when one or more XOR gates 10 are connected to other types of optical logic gates as disclosed in U.S. patent application Ser. Nos. 12/182,683 and 12/270,221).

The second light portion 120' of the "B" input 120 is directed into the first PD 16 where the light from the portion 120' is absorbed to generate a photocurrent signal in the PD 16. This photocurrent signal is conducted through wiring 28 on the substrate 12 to the first EAM 14 to change a bias voltage across the EAM 14, thereby modulating an absorption of the first light portion 110' of the "A" input 110 being transmitted through the first EAM 14. This produces a first inverted AND function output 140 from the first EAM 14, with the first inverted AND function output 140 being given by A and not B (i.e. as shown in FIG. 2B).

The fourth light portion 110" of the "A" input 110 is directed into the second PD 20 where the light from the portion 110" is absorbed to generate another photocurrent signal which is used to change the bias voltage across the second EAM 18 and thereby modulate the absorption of the third light portion 120" of the "B" input 120 being transmitted through the second EAM 18. This produces a second inverted AND function output 140' from the second EAM 18 given by not A and B (i.e. $\overline{A}B$ as shown in FIG. 2B).

As can be seen from the above discussion, the term "inverted AND function output" as used herein refers to an optical output signal 140 or 140' which is generated from the light portion 110' or 120" representing the "A" or "B" input, respectively, with the light portion 110' or 120" being optically modulated with a logically-inverted representation of the "B" or "A" input by the EAM 14 or 18 to generate the optical output signal 140 or 140' having the logic state representation $A\overline{B}$ or $\overline{A}B$, respectively, as shown in FIG. 2B. In an electrical sense, this would be equivalent to having an electrical output signal generated by a dual-input AND gate with an inverter (i.e. a NOT gate) connected to one input of the dual-input AND gate. In the optical XOR gate 10 of the present invention, the logical inversion process is due to the photocurrent signal generated by each PD 16, 20 which changed the bias voltage applied to each EAM 14, 18 electrically connected in series with that PD 16, 20. This will be described in detail hereinafter.

Returning to FIGS. 1 and 2A, the two inverted AND function outputs 140 and 140' from the EAMs 14 and 18 are combined to form the XOR output 130. This can be done using a branching-waveguide Y junction coupler 30 as shown in FIG. 1, or alternately using a 2×1 MMI coupler. In some embodiments of the present invention, the two outputs 140 and 140' can be coupled off the substrate 12 into separate optical fibers and then combined using an optical fiber coupler to generate the XOR output 130.

Since the "A" and "B" inputs 110 and 120, respectively, are digital optical signals, then the photocurrent signals (i.e. photocurrents) generated by each PD 16 and 20 will also generally be digital signals depending upon a data rate for operation of the device 10 which can be up to 100 gigaHertz (GHz) or more. Any of the light from the portions 110" and 120" from the "A" and "B" inputs which is not absorbed within the PDs to generate the photocurrent signals can be coupled into L-shaped optical waveguides 36 as shown in FIG. 1, with these L-shaped optical waveguides acting as light traps.

In FIG. 1, the first EAM 14 and the first PD 16 are electrically connected together in series by wiring 28 on the substrate 12. This wiring 28, which can be in the form of a radio-frequency (rf) transmission line, connects an upper electrode 32 of the first EAM 14, which forms the anode side of the EAM 14, to an lower electrode 34' of the first PD 16 which forms the cathode side of the PD 16. This wiring 28 also connects the anode side of the first EAM 14 through a load resistor 38 (e.g. a 20-50 Ohm resistor) to ground (i.e. a ground electrical connection which can be common with a first bias voltage $V_1$ and a second bias voltage $V_2$) (see also FIG. 2A). The first bias voltage $V_1$ is used to reverse-bias the first EAM 14; and the second bias voltage $V_2$ is used to reverse-bias the first PD 16 (see also FIG. 2A). Additional wiring 28 is used to connect a lower electrode 32' of the first EAM 14, which forms the cathode side of the EAM 14, to the bias voltage $V_1$, and to connect an upper electrode 34 of the first PD 16, which forms the anode side of the PD 16, to the bias voltage $V_2$. Similar electrical connections are made for the second EAM 18 and the second PD 20.

The first bias voltage $V_1$ can be set so that each EAM 14, 18 is normally "on" to allow the light portions 110', 120" to be transmitted through the EAMs 14, 18. The second bias voltage $V_2$ can then be set at a level which reverse biases the PD 16 or 20 for high-speed operation. The first bias voltage $V_1$ can be, for example, −1 Volt; and the second bias voltage $V_2$ can be, for example, −5 Volts. The bias voltages $V_1$ and $V_2$ can be supplied by direct-current (dc) power supplies located off of the substrate 12 as shown in FIG. 1 and connected to the wiring 28 via bond pads 40 on the substrate 12.

In the example of FIGS. 1 and 2A, the same bias voltages $V_1$ and $V_2$ can be used for the two EAM/PD pairs (i.e. EAM 14/PD 16, and EAM 18/PD 20). In other embodiments of the present invention, separate voltage sources can be used to bias each EAM 14, 18 and each PD 16, 20 to provide an independent control over the bias for these elements.

For operation at a high speed of about 40 Gigabytes per second (Gb-s$^{-1}$) or more, the wiring 28 between the PDs 16, 20, the EAMs 14, 18 and the resistors 38 can comprise radio-frequency (rf) transmission lines with low-loss rf by-pass capacitors. In FIG. 1, the by-pass capacitors, which are well-known in the art, have been omitted for clarity. In certain embodiments of the present invention, the impedance of the rf transmission lines can provide a substitution for the resistors 38 which can then be omitted.

By design, the photocurrent signal generated by the first PD 16 in response to detection of the second light portion 120' from the "B" input 120 is relatively independent of an electric field produced in the PD 16 by the applied reverse-bias voltage $V_2$ and depends only upon the intensity of the incident light. This is also the case for the second PD 20 in detecting the fourth light portion 110" from the "A" input 110.

On the other hand, the absorption within the first EAM 14 depends upon the electric field produced therein by the applied reverse-bias voltage $V_1$ and any portion of the bias voltage $V_2$ which is dropped across the EAM 14 as a result of the photocurrent generated by the first PD 16 upon detecting the second light portion 120'. As the amount of the reverse-bias voltage dropped across the electroabsorption modulator 14 increases in response to the photocurrent generated by the PD 16, the absorption of light in the first EAM 14 will increase either due to a Franz-Keldysh effect, or due to a quantum-confined Stark effect. This is also the case for the second EAM 18 with the absorption of light therein being dependent on the photocurrent generated by the second PD 20 upon detecting the fourth light portion 110".

In the absence of any light input into the first PD 16 due to the "B" input 120 being in a logical "0" state at a particular instant in time, no photocurrent signal will be generated from the PD 16 so that a node "C" in FIG. 2A where the EAM 14 is electrically connected to the resistor 38 and PD 16 will be at about ground electrical potential. This drops the entire reverse-bias voltage $V_1$ (e.g. −1 Volt) across the first EAM 14. Since $V_1$ is relatively small, a relatively small absorption of the first light portion 110' of the "A" input 110 will be produced within the modulator 14 so that substantially all of the portion 110' of the "A" input 110 will be transmitted through the modulator 14 to provide a logic state for the first inverted AND function output 140 which is given by the logic state of the "A" input 110.

At another instant in time when the "B" input 120 is in a logical "1" state corresponding to a relatively high light level for the second light portion 120', a relatively large photocurrent will be generated in the PD 16 due to detection of the second light portion 120' in the logical "1" state. This relatively large photocurrent will flow through the resistor 38 and produce a relatively large change in the electrical potential at node "C" in FIG. 2A due to the reverse-bias voltage $V_2$ (e.g. −5 Volts) being much larger than $V_1$ (e.g. −1 Volt). The change in the electrical potential at node "C" will add to $V_1$ to increase the overall amount of reverse-bias voltage which is dropped across the first EAM 14 from about one Volt, for example, to several Volts. This increase in the overall amount of the reverse-bias voltage dropped across the first EAM 14 will greatly increase the absorption of the first light portion 110' therein so that little, if any, of the portion 110' will be transmitted through the EAM 14 at that instant in time, thereby providing a logic state "0" for the first inverted AND function output 140 (i.e. the inverse of the logical "1" state of the "B" input 120 irrespective of the logic state of the "A" input 110).

Thus, the series-connected combination of the EAM 14 and PD 16 in FIGS. 1 and 2A provides the output 140 given by the logic state of the "A" input 110 and the inverse of the logic state of the "B" input 120 (i.e. $A\overline{B}$ as shown in FIG. 2B). In a similar manner, the series-connected combination of the EAM 18 and the PD 20 in FIGS. 1 and 2A function to provide the output 140' given by the logic state of the "B" input 120 and the inverse of the logic state of the "A" input 110 (i.e. $\overline{A}B$ as shown in FIG. 2B). Combining the two inverse AND function outputs 140 and 140' in the branching-waveguide Y junction coupler 30 then generates the XOR function digital optical output 130 of the XOR gate 10 as shown in the truth table of FIG. 2B.

Fabrication of the optical XOR gate 10 of FIG. 1 will now be described with reference to FIGS. 3A-3G which show a series of schematic cross-section views of the device 10 along the section line 1-1 in FIG. 1 during various steps in the fabrication of the optical XOR gate 10, and with reference to FIG. 3H which shows a schematic cross-section view along the section line 2-2 in FIG. 1. Fabrication of the optical XOR gate 10 of FIG. 1 will be described using a quantum-well intermixing process using a plurality of III-V compound semiconductor layers which are epitaxially grown on the substrate 12 which can also be a III-V compound semiconductor substrate (e.g. comprising indium phosphide or gallium arsenide). The quantum-well intermixing process allows the fabrication of many different photonic integrated circuit (PIC) elements to be formed on the same substrate 12 in a manner similar to that of semiconductor integrated circuit (IC) fabrication, while allowing the various elements, which can include passive optical waveguides, waveguide photodetectors, waveguide electroabsorption modulators, lasers, and semiconductor optical amplifiers, to be individually optimized.

Those skilled in the art will understand that the optical XOR gate 10 of the present invention can also be fabricated using other types of III-V compound semiconductor fabrication methods which are well-known in the art. These other types of III-V compound semiconductor fabrication methods include butt-joint regrowth, selective area growth, and the use of offset quantum wells and are detailed in the following articles which are incorporated herein by reference: E. Skogen et al., "Monolithically Integrated Active Components: A Quantum-Well Intermixing Approach," *IEEE Journal of Selected Topics in Quantum Electronics*, vol. 11, pp. 343-355, March/April 2005; J. W. Raring et al., "40-Gb/s Widely Tunable Transceivers," *IEEE Journal of Selected Topics in Quantum Electronics*, vol. 13, pp. 3-14, January/February 2007.

Figure 3A:
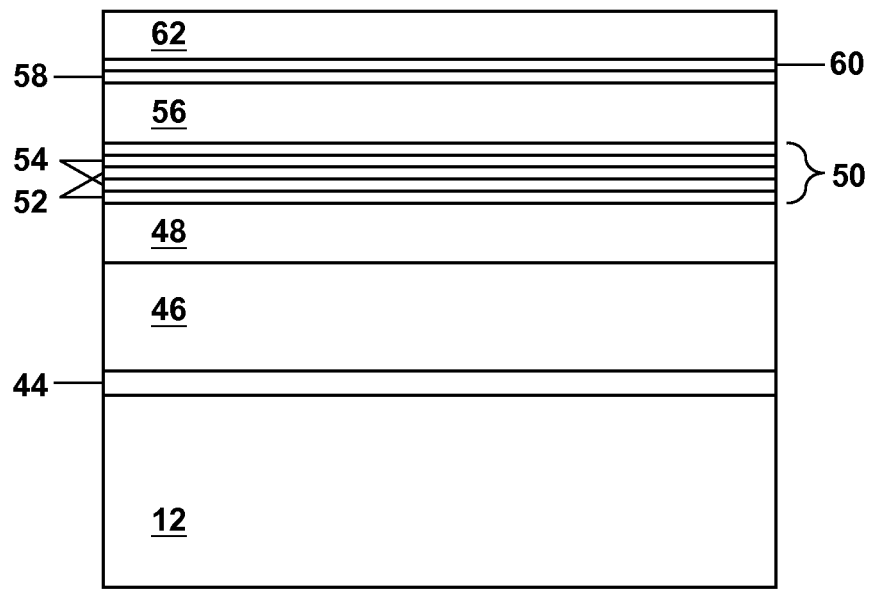
FIGS. 3A-3H show schematic cross-section views along the section lines 1-1 and 2-2 in FIG. 1 to illustrate a series of process steps in the fabrication of the optical XOR gate of FIG. 1.
Figure 3B:
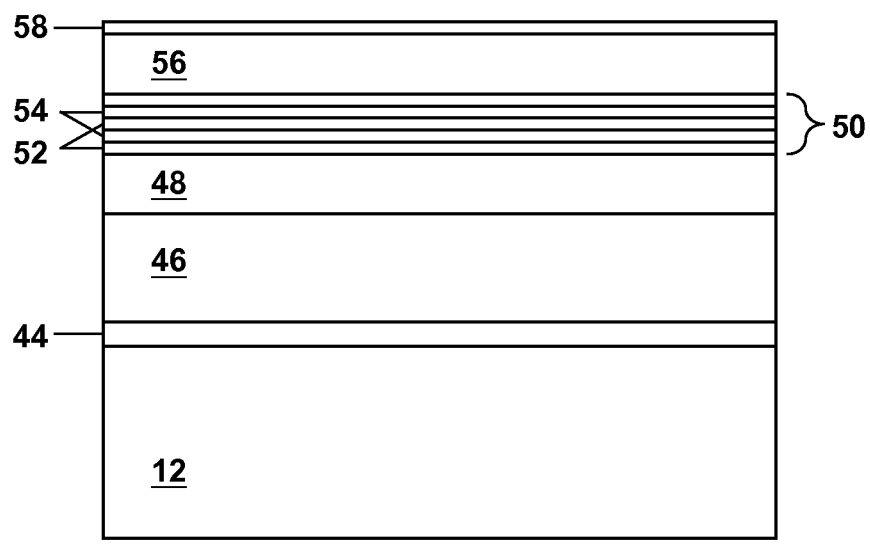

FIG. 3A shows a schematic cross-section view of the plurality of III-V compound semiconductor layers which can be initially epitaxially grown on the substrate 12 in preparation for fabricating the optical XOR gate 10 of the present invention. The III-V compound semiconductor layers can comprise, for example, indium phosphide (InP), indium gallium arsenide phosphide (InGaAsP), indium gallium arsenide (InGaAs), indium aluminum gallium arsenide (InAlGaAs) layers and combinations thereof when the substrate 12 comprises InP. When the substrate comprises gallium arsenide (GaAs), the III-V compound semiconductor layers can comprise GaAs, aluminum gallium arsenide (AlGaAs), InGaAsP, InGaAs, and combinations thereof. The following discussion will describe fabrication of the optical XOR gate 10 using an InP substrate 12 with InP, InGaAsP and InGaAs layers thereon, but those skilled in the art will understand that the various process steps described hereinafter can be applied with minor modifications to an optical XOR gate 10 formed on a GaAs substrate 12 with a combination of GaAs, AlGaAs, InGaAsP, and InGaAs layers thereon. Those skilled in the art will also understand that other III-V compound semiconductor materials can be used for the substrate 12 and layers epitaxially grown thereon.

In FIG. 3A, the substrate 12 can comprise a semi-insulating Fe-doped InP substrate 12. A plurality of III-V compound semiconductor layers can be epitaxially grown on the Fe-doped InP substrate 12 by metal-organic chemical vapor deposition (MOCVD). These III-V compound semiconductor layers are in order of epitaxial growth: an InP buffer layer (not shown), an n-type InGaAs lower contact layer 44; a lower cladding layer 46 of n-type-doped InP which can be 1-2 μm thick; a lower waveguide layer 48 of InGaAsP which is undoped (i.e. not intentionally doped) and about 0.11 μm thick with a composition selected to provide an energy bandgap wavelength $\lambda_g$=1.3 μm; an undoped MQW region 50 which is about 0.11 μm thick and comprises a plurality of alternating quantum well (QW) layers 52 and barrier layers 54 of InGaAsP, with the quantum well layers 52 being about 6.5 nanometers (nm) thick and having an energy bandgap wavelength $\lambda_g$ of, for example, 1.55 μm as measured by photoluminescence, and with the barrier layers 54 being about 8 nm thick and having an energy bandgap wavelength $\lambda_g$=1.3 μm; a upper waveguide layer 56 of undoped InGaAsP about 0.11 μm thick with $\lambda_g$=1.3 μm; an undoped InP etch stop layer 58 about 15 nm thick; an undoped InGaAsP etch stop layer 60 about 20 nm thick with $\lambda_g$=1.3 μm; and an undoped InP implant buffer layer 62 about 0.45 μm thick. As an example, the QW layers 52 can have the semiconductor alloy composition $In_xGa_{1-x}As_yP_{1-y}$ with x=0.735 and y=0.840 to provide the energy bandgap wavelength $\lambda_g$=1.55 μm; and the barrier layers 54 can be formed of $In_xGa_{1-x}As_yP_{1-y}$ with x=0.735 and y=0.513. Those skilled in the art will understand that the exact composition of the layers 52 and 54 in the MQW region 50 and the compositions of the other III-V compound semiconductor layers can be adjusted as needed to provide predetermined values for energy bandgaps of these layers, with the energy bandgap wavelength $\lambda_g$ of the QW layers 52 generally being in the range of 0.8-2.0 μm.

An ion implant mask (e.g. comprising silicon nitride about 0.5 μm thick) can then be provided over the substrate 12 and III-V compound semiconductor layers with openings at locations wherein phosphorous ions are to be implanted into the InP implant buffer layer 62 for use in selectively disordering the MQW region 50. The locations where the PDs 16 and 20 and a gain region of the SOAs 26, if used, will generally not have a disordered MQW region 50 since the MQW region 50 is epitaxially grown to optimize the performance of the PDs 16 and 20 and the gain region of the SOAs 26. The phosphorous ions can be implanted into the InP implant buffer layer 62 at an ion energy of about 100 keV and a dose of about $5 \times 10^{14}$ cm$^{-2}$ with the substrate 12 being at a temperature of about 200° C. The implanted phosphorous ions produce point defects in the InP implant buffer layer 62.

A rapid thermal annealing step can then be used to drive the point defects down into the MQW region 50 to intermix the QW layers 52 and the barrier layers 54 at the interfaces therebetween. This intermixing produces a blue-shift the energy bandgap wavelength in the MQW region 50. The rapid thermal annealing step can be performed at a temperature in the range of 630-700° C. and can be timed for a time interval from about one-half minute up to a few tens of minutes to provide a predetermined energy bandgap wavelength for the MQW region 50 which will depend upon the exact elements of the optical XOR gate 10 being formed. To form the EAMs 14 and 18, a first rapid thermal annealing step can be used to provide a few tens of nanometer blue-shift in the energy bandgap wavelength of the MQW region 50 (e.g. to $\lambda_g \sim 1.50$ μm) to reduce an absorption loss therein in the absence of any reverse-bias voltage. This same blue-shift is provided for the MQW region 50 for the optical waveguide splitters 22, the waveguides 24 and the branching-waveguide Y junction coupler 30, and also for the gain region of the SOAs 26, if used. An additional blue-shift will be provided in a subsequent thermal annealing step for the splitters 22, waveguides 24 and coupler 30 to further increase the blue-shift therein (e.g. to $\lambda_g \sim 1.43$ μm) and thereby further reduce the absorption in these elements. The blue-shift in the energy bandgap wavelength of the MQW region 50 can be determined using a laser-excited photoluminescence spectroscopy measurement at room-temperature.

After the first rapid thermal annealing step, the InP implant buffer layer 62 can be removed above the EAMs 14 and 18 while leaving the layer 62 in place over the splitters 22, waveguides 24 and coupler 30. This can be done using a wet etching step to etch away the layer 62, with the wet etching being terminated upon reaching the InGaAsP etch stop layer 60. Removal of the InP implant buffer layer 62 above the EAMs 14 and 18 prevents any further blue-shift in the MQW region 50 at these locations since it removes the source of point defects necessary for quantum-well intermixing.

A second rapid thermal annealing step can then be performed at about the same temperature for up to a few minutes (e.g. 2-3 minutes) to provide further intermixing of the QW and barrier layers 52 and 54 to produce an additional few tens of nanometers blue-shift the energy bandgap of the MQW region 50 in the remaining regions where the InP implant buffer layer 62 is still present. This additional blue-shift in the energy bandgap of the MQW region 50 further reduces the absorption loss in the splitters 22, waveguides 24 and coupler 30. After the second rapid thermal annealing step is performed, the remaining InP implant buffer layer 62 and the InGaAsP etch stop layer 60 can be completely removed from the substrate 12 by wet etching. This is schematically illustrated in the cross-section view of FIG. 3B.

Figure 3C:
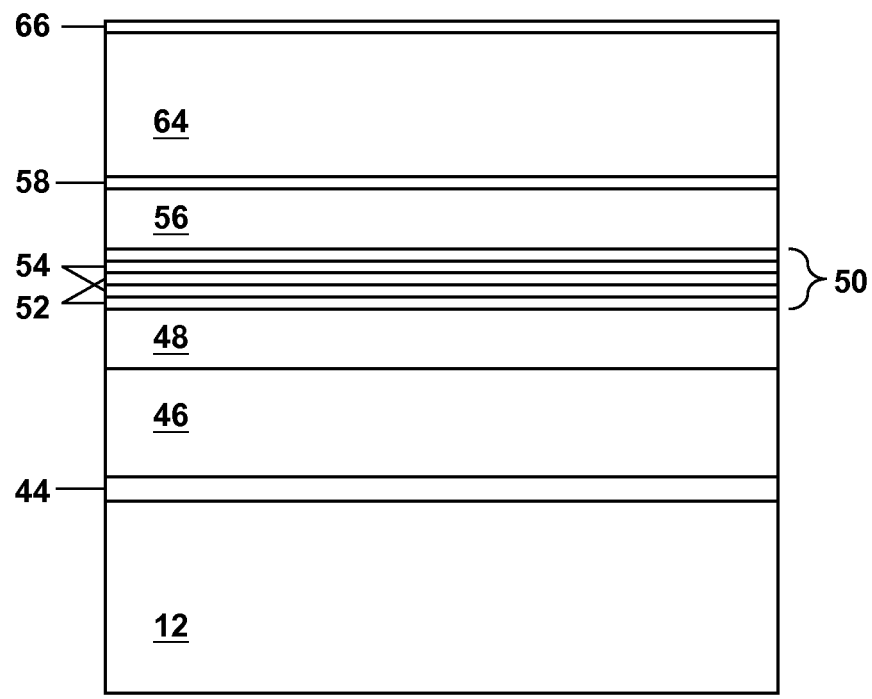

A blanket MOCVD regrowth can then be performed to epitaxially grow an upper cladding layer 64 of p-type-doped InP which can be, for example, 2.35 μm thick followed by a cap layer 66 of p-type-doped InGaAs about 0.2 μm thick. This is shown in FIG. 3C. The p-type-doped InP upper cladding layer 64 in combination with the n-type-doped lower cladding layer 46 form a semiconductor p-i-n junction about the MQW region 50 and waveguide layers 48 and 56 which are undoped (i.e. intrinsic). This semiconductor p-i-n junction can be used for electrically-activated elements in the optical XOR gate 10 including the PDs 16 and 20, the EAMs 14 and 18 and the gain region of the SOAs 26, if used.

In other embodiments of the present invention, an offset quantum-well region can be epitaxially grown above the upper waveguide layer 56. This can be useful to form the PDs 16 and 20 as uni-traveling carrier photodetectors, and can also be useful to form the SOAs 26. The use of an offset quantum-well region provides a lower confinement factor than the quantum-well region 50 and thus can increase the saturation power level for the PDs 16 and 20 and any SOAs 26 and also allow operation at higher optical data rates. Further details of the fabrication of PDs and SOAs using offset quantum-well region can be found in an article by J. W. Raring et al., "Design and Demonstration of Novel QW Intermixing Scheme for the Integration of UTC-Type Photodiodes with QW-Based Components," *IEEE Journal of Quantum Electronics*, vol. 42, pp. 171-181, February 2006, which is incorporated herein by reference.

Figure 3D:
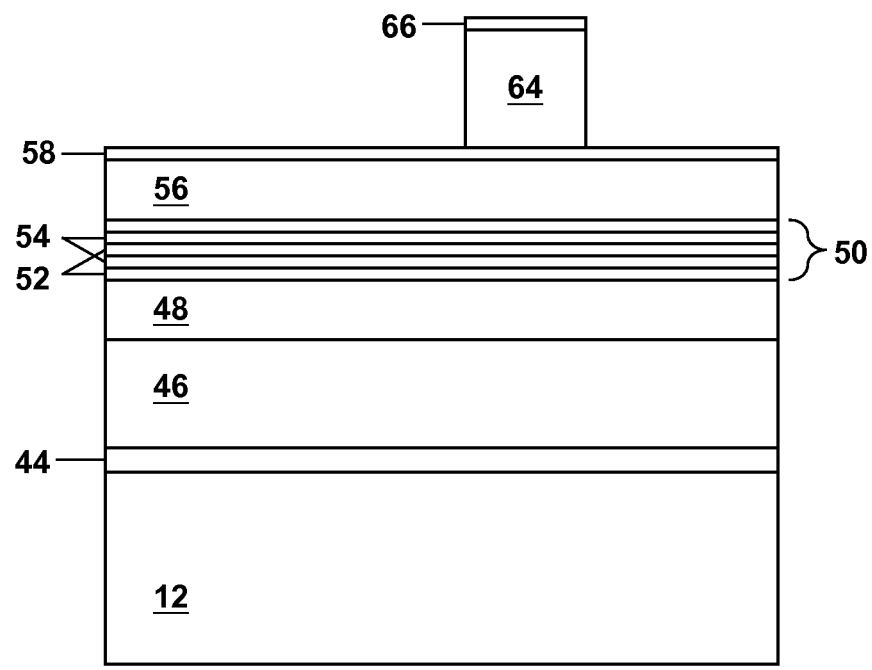

An etch mask (not shown) can be provided over the substrate 12 and photolithographically patterned for use in etching down through the InGaAs cap layer 66 and the InP upper cladding layer 64 as shown in FIG. 3D. This defines an effective waveguide width of the various elements in FIG. 1 which can be, for example, up to a few microns or more (e.g. 1-3 μm for the waveguides 24 and EAMs 14, 18, and up to about 10 μm wide for the PDs 16, 20, the splitters 22, 22' and any SOAs 26). The PDs 16, 20 can each have a length of, for example, 30-70 μm; and can be straight (e.g. when the PDs 16, 20 have the same width as the waveguides 24) or can be tapered at one or both ends thereof (e.g. when the PDs 16, 20 have a width that is larger than the width of the waveguides 24). The EAMs 14, 18 can have a length of, for example, 100-300 μm. The splitters 22, 22' can have a length of, for example, 420 μm. An overall size for the entire optical XOR gate 10 of FIG. 1 can be, for example, about 0.8 mm×1.5 mm.

Figure 3E:
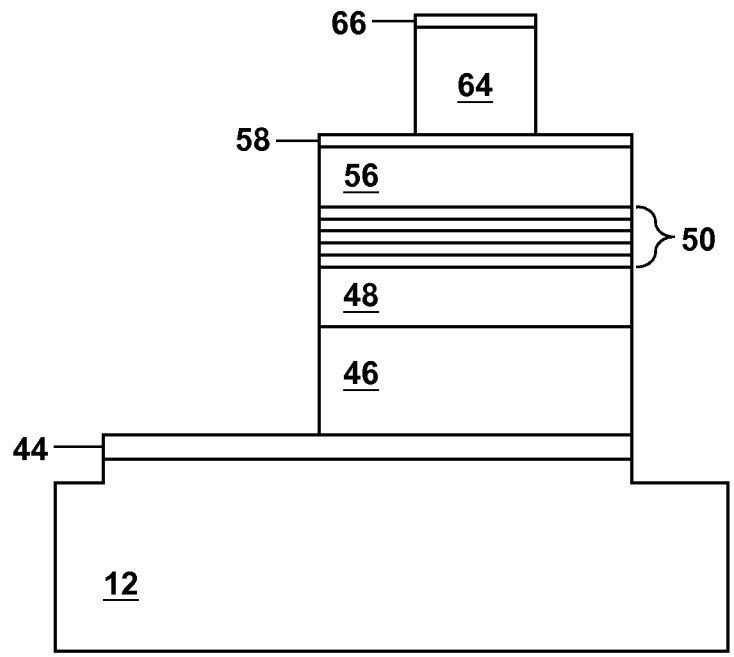

In FIG. 3E, one or more additional etching steps can be used to etch down to the InGaAs lower contact layer 44 and partway into the semi-insulating InP substrate 12.

Figure 3F:
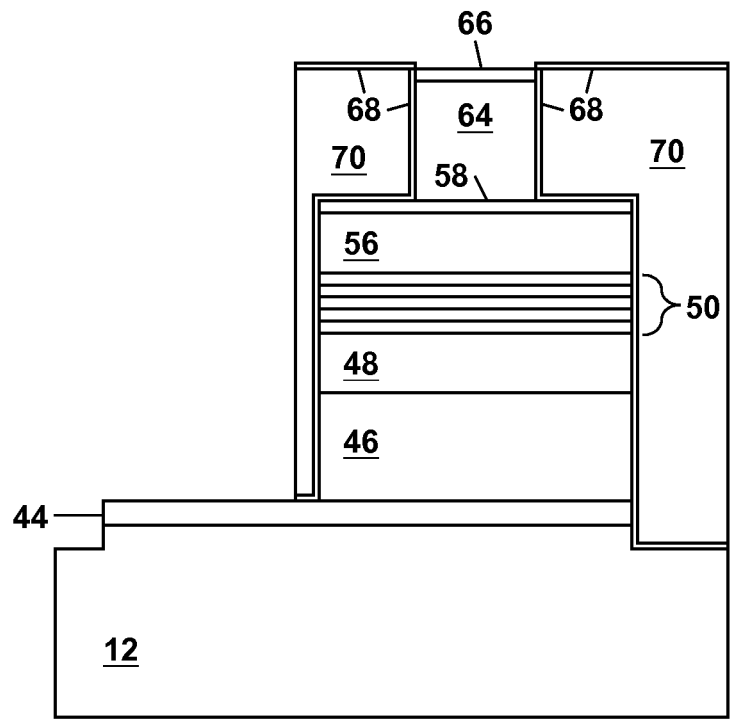

In FIG. 3F, layers of silicon nitride 68 and benzocyclobutene (BCB) 70 can then be deposited over the substrate 12 about the PDs 16, 20, the EAMs 14, 18 and the SOAs 26, if used, with openings at the locations where the upper and lower electrodes for these elements will be formed. The BCB 70 can be optionally tapered to allow the resistors 38 to be formed directly over the silicon nitride layer 68 on the InP substrate 12. This can be useful for heat sinking of the resistors 38 to the InP substrate 12. The silicon nitride layers 68 can each be about 0.1-0.2 μm thick.

Figure 3G:
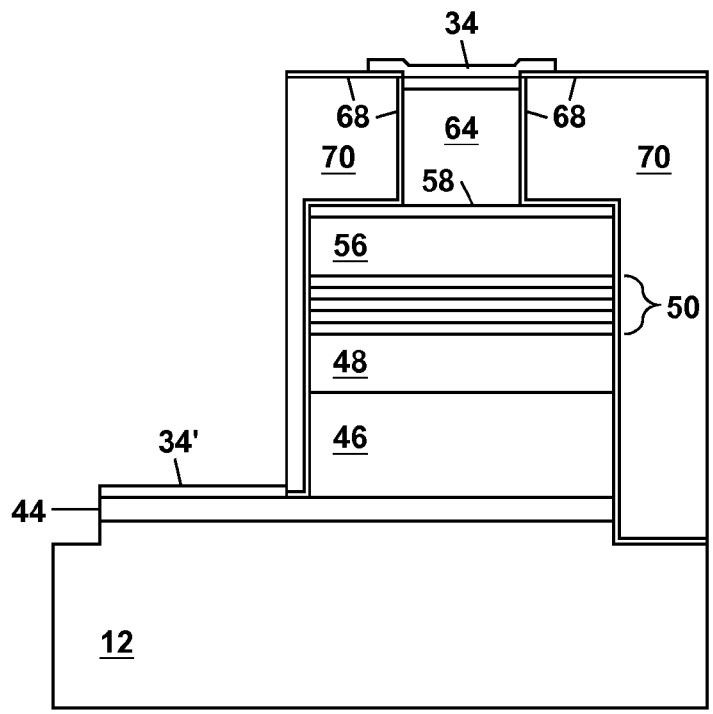
Figure 3H:
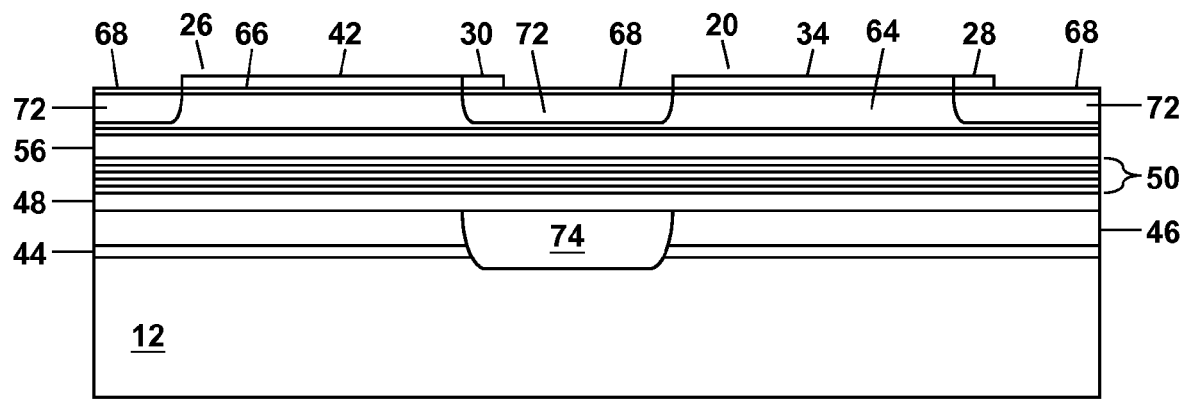

In FIG. 3G, the lower and upper electrodes can be deposited. The lower electrodes 32', 34' and 42' can comprise, for example, a gold/germanium/nickel/gold (Au/Ge/Ni/Au) metallization with an overall thickness of about 0.5 μm; and the upper electrodes 32, 34 and 42 and the wiring 28 and bond pads 40 can be formed from a titanium/platinum/gold (Ti/Pt/Au) metallization with an overall thickness of about 1 μm. The resistors 38 can be deposited as thin-film metal resistors (e.g. comprising tantalum nitride or nichrome) with a resistance of, for example, 25-50 Ohms.

Adjacent elements of the optical XOR gate 10, which are not optically connected, can be electrically isolated by etching down partway into the semi-insulating InP substrate 12 as shown in FIG. 3G. However, this does not electrically isolate adjacent elements of the optical XOR gate 10 which must be optically connected via one of the waveguides 24. For these elements such as the optional SOAs 26 which must be forward biased while being optically connected to the PDs 16, 20 which must be reverse biased, the III-V compound semiconductor layers in a waveguide region between these optically-connected elements can be ion implanted for electrical isolation. Hydrogen ions can be implanted at an energy of about 200 keV to electrically isolate regions 72 of the p-type-doped III-V compound semiconductor layers; and helium ions can be implanted at an energy of about 2 MeV to electrically isolate regions 74 of the n-type-doped III-V compound semiconductor layers, with the helium-implanted regions 74 extending down partway into the InP substrate 12. The hydrogen-implanted regions 72 can also extend around the elements 16, 20, and 26 as shown in FIG. 3H to improve the electrical characteristics of these elements. The helium-implanted regions 74 are located where the n-type-doped III-V compound semiconductor layers extend between the SOAs 26 and the adjacent PDs 16, 20. The ion implantation steps can be performed with suitable masking to protect the elements 16, 20 and 26 after epitaxial growth of the InP layer 64 and the InGaAs cap layer 66 as previously described with reference to FIG. 3C. FIG. 3H shows a schematic cross-section view along the section line 2-2 in FIG. 1 to illustrate the locations of hydrogen-implanted regions 72 and the helium-implanted regions 74 in the completed device 10.

When SOAs 26 are provided in the optical XOR gate 10, this is useful to amplify the second light portion 120' of the "B" input 120 and the fourth light portion 110" of the "A" input 110 to provide an optical power level of up to a few tens of milliWatts of peak optical power for these optical signals 120', 110" prior to detection by the PDs 16, 20, thereby providing larger photocurrent signals from the PDs 16, 20 and a resultant larger on/off contrast for the inverted AND function outputs 140, 140' generated by the EAMs 14, 18 and also providing a larger on/off contrast for the output 130 of the XOR gate 10.

The gain region for each SOA 26 can have a length of, for example, 100-500 μm, and a width of, for example, 1-10 μm. The width of the gain region of each SOA 26 can be uniform, or can be flared. The use of a flared width for each SOA 26 can be useful to provide a higher saturation power level for the SOA 26, thereby providing a larger amplification of the optical signals 120' and 110". Each SOA 26 can be driven by a current source $I_1$ and $I_2$ as shown in FIG. 1 which forward biases each SOA 26 to generate the optical gain therein. The optical gain of each SOA 26 can be, for example, up to 12 dB or more. The SOAs 26, when used, can be fabricated as previously described with reference to FIGS. 3A-3H.

Those skilled in the art will understand that the optical XOR gate 10 of the present invention is a base logic gate that can be used to implement other logic functions. The optical XOR gate 10 of the present invention can be used alone to digitally process optical information, or as a building block to form an optical logic circuit, an optical signal processor, an optical computer, etc. A plurality of optical XOR gates 10 can be formed on a common substrate 12 and optically connected with waveguides 24 to other XOR gates 10 and/or to other types of optical logic gates such as the optical NAND and NOR gates described in U.S. patent application Ser. Nos. 12/182,683 and 12/270,221 and the optical data latch described in U.S. Pat. No. 7,787,719. Connection of these various types of optical logic gates and data latches can be performed optically using waveguides 24 in a manner which is analogous to the interconnection of electronic logic gates and latches in an integrated circuit, an electronic signal processor, computer, etc. Thus, for example, to form an optical signal processor or optical computer, the XOR outputs 130 from one or more optical XOR gates 10 can be used as the "A" and "B" inputs for other XOR gates 10, NAND gates, NOR gates, or optical data latches as disclosed in the above patent applications and patent to provide a higher level of complexity as needed for increased functionality.

The optical XOR gate 10 of the present invention can also be formed on other types of substrates 12, including Group IV semiconductor substrates (e.g. silicon or silicon-on-insulator substrates). In these embodiments of the present invention, the PDs 16, 20 and EAMs 14, 18 can be formed with semiconductor p-n or p-i-n junctions comprising silicon or germanium-silicon. Germanium-silicon and germanium-silicon quantum wells are particularly useful for PDs 16, 20 and EAMs 14, 18 operating at a wavelength near 1.5 μm. Modulation of the transmission in the EAMs 14, 18 in these embodiments of the present invention can be via free carrier injection/depletion, or via the quantum-confined Stark effect. The optical waveguide splitters 22, 22', the optical waveguides 24 and the optical combiner 30 can be formed, for example from silicon (e.g. a monocrystalline silicon layer of a silicon-on-insulator substrate), or from silicon nitride. If needed, SOAs 26 can be provided in these embodiments of the XOR gate 10 of the present invention as III-V compound semiconductor hybrid devices which can be attached to the Group IV semiconductor substrates using an adhesive, solder, or wafer bonding.

The matter set forth in the foregoing description and accompanying drawings is offered by way of illustration only and not as a limitation. The actual scope of the invention is intended to be defined in the following claims when viewed in their proper perspective based on the prior art.

What is claimed is:

1. A photonic integrated circuit (PIC) which generates an XOR function digital optical output from a pair of digital optical inputs, comprising:

a substrate;

a first set of optical waveguide devices on the substrate, with the first set of optical waveguide devices comprising a first electroabsorption modulator and a first photodetector which are electrically connected in series, with the first electroabsorption modulator receiving a first light portion split out from a first digital optical input of the pair of digital optical inputs by a first optical waveguide splitter on the substrate, and with the first photodetector receiving a second light portion split out from a second digital optical input of the pair of digital optical inputs by a second optical waveguide splitter on the substrate, and with the first photodetector generating from the second light portion a photocurrent signal which changes a reverse-bias voltage on the first electroabsorption modulator to generate a first inverted AND function output from the first light portion;

a second set of optical waveguide devices on the substrate, with the second set of optical waveguide devices comprising a second electroabsorption modulator and a second photodetector which are electrically connected in series, with the second electroabsorption modulator receiving a third light portion split out from the second digital optical input by the second optical waveguide splitter, and with the second photodetector receiving a fourth light portion split out from the first digital optical input by the first optical waveguide splitter, and with the second photodetector generating from the fourth light portion another photodetector signal which changes the reverse-bias voltage on the second electroabsorption modulator to generate a second inverted AND function output from the third light portion; and an optical combiner to combine the first and second inverted AND function outputs to form the XOR function digital optical output.

2. The apparatus of claim 1 further comprising a first resistor which is electrically connected from an anode side of the first electroabsorption modulator to ground, and a second resistor which is electrically connected from the anode side of the second electroabsorption modulator to ground.

3. The apparatus of claim 1 further comprising at least one semiconductor optical amplifier on the substrate to amplify at least one optical signal selected from the group consisting of the first digital optical input, the second digital optical input, the first light portion, the second light portion, the third light portion, the fourth light portion, and the XOR function digital optical output.

4. The apparatus of claim 1 further comprising a plurality of optical waveguides on the substrate to guide the first light portion from the first optical waveguide splitter to the first electroabsorption modulator, to guide the second light portion from the second optical waveguide splitter to the first photodetector, to guide the third light portion from the first optical waveguide splitter to the second electroabsorption modulator, and to guide the fourth light portion from the first optical waveguide splitter to the second photodetector.

5. The apparatus of claim 1 wherein the optical combiner is located on the substrate.

6. The apparatus of claim 1 wherein the substrate comprises a III-V compound semiconductor substrate, and each electroabsorption modulator and each photodetector comprises a plurality of III-V compound semiconductor layers which are epitaxially grown on the III-V compound semiconductor substrate.

7. The apparatus of claim 6 wherein the III-V compound semiconductor substrate comprises indium phosphide (InP), and the plurality of III-V compound semiconductor layers are selected from the group consisting of indium gallium arsenide phosphide (InGaAsP) layers, indium gallium arsenide (InGaAs) layers, indium aluminum gallium arsenide (InAlGaAs) layers, and combinations thereof.

8. The apparatus of claim 6 wherein the III-V compound semiconductor substrate comprises gallium arsenide (GaAs), and the plurality of III-V compound semiconductor layers are selected from the group consisting of GaAs layers, aluminum gallium arsenide (AlGaAs) layers, indium gallium arsenide phosphide (InGaAsP) layers, indium gallium arsenide (InGaAs) layers, and combinations thereof.

9. The apparatus of claim 1 wherein the first digital optical input and the second digital optical input have a wavelength in the range of 0.8-2.0 microns.

10. An optical XOR gate which receives a first digital optical input and a second digital optical input and generates therefrom an XOR function digital optical output, comprising:
a III-V compound semiconductor substrate having a plurality of III-V compound semiconductor layers epitaxially grown thereon;
a first electroabsorption modulator formed from the plurality of III-V compound semiconductor layers, with the first electroabsorption modulator receiving a first light portion of the first digital optical input;
a first waveguide photodetector formed from the plurality of III-V compound semiconductor layers to receive a second light portion of the second digital optical input and to generate therefrom a first photocurrent signal which changes an absorption of light in the first electroabsorption modulator, thereby modulating the first light portion being transmitted through the first electroabsorption modulator to provide a first digitally-modulated output from the first electroabsorption modulator;
a second electroabsorption modulator formed from the plurality of III-V compound semiconductor layers, with the second electroabsorption modulator receiving a third light portion of the second digital optical input;
a second waveguide photodetector formed from the plurality of III-V compound semiconductor layers to receive a fourth light portion of the first digital optical input and to generate therefrom a second photocurrent signal which changes the absorption of light in the second electroabsorption modulator, thereby modulating the third light portion being transmitted through the second electroabsorption modulator to provide a second digitally-modulated output from the second electroabsorption modulator; and
an optical waveguide combiner to combine the first and second digitally-modulated outputs to generate the XOR function digital optical output.

11. The apparatus of claim 10 wherein the first electroabsorption modulator and the first waveguide photodetector are electrically connected in series, and the second electroabsorption modulator and the second waveguide photodetector are electrically connected in series.

12. The apparatus of claim 10 further comprising a first resistor which is electrically connected from an anode side of the first electroabsorption modulator to ground, and a second resistor which is electrically connected from the anode side of the second electroabsorption modulator to ground.

13. The apparatus of claim 10 wherein the first and third light portions of the first digital optical input are provided by a first optical waveguide splitter which is formed from the plurality of III-V compound semiconductor layers, and the second and fourth light portions of the second digital optical input are provided by a second optical waveguide splitter which is formed from the plurality of III-V compound semiconductor layers.

14. The apparatus of claim 10 wherein the optical waveguide combiner is formed from the plurality of III-V compound semiconductor layers.

15. The apparatus of claim 10 wherein the III-V compound semiconductor substrate comprises indium phosphide (InP), and the plurality of III-V compound semiconductor layers are selected from the group consisting of indium gallium arsenide phosphide (InGaAsP) layers, indium gallium arsenide (InGaAs) layers, indium aluminum gallium arsenide (InAlGaAs) layers, and combinations thereof.

16. The apparatus of claim 10 wherein the III-V compound semiconductor substrate comprises gallium arsenide (GaAs), and the plurality of III-V compound semiconductor layers are selected from the group consisting of GaAs layers, aluminum gallium arsenide (AlGaAs) layers, indium gallium arsenide phosphide (InGaAsP) layers, indium gallium arsenide (InGaAs) layers, and combinations thereof.

17. The apparatus of claim 10 wherein a plurality of passive optical waveguides are formed from the plurality of III-V compound semiconductor layers to guide the first light portion to the first electroabsorption modulator, to guide the second light portion to the first waveguide photodetector, to guide the third light portion to the second electroabsorption modulator, and to guide the fourth light portion to the second waveguide photodetector.

18. The apparatus of claim 10 wherein the first digital optical input and the second digital optical input have a wavelength in the range of 0.8-2.0 microns.

19. The apparatus of claim 10 further comprising at least one semiconductor optical amplifier formed from the plurality of III-V compound semiconductor layers to amplify at least one optical signal selected from the group consisting of the first digital optical input, the second digital optical input, the first light portion, the second light portion, the third light portion, the fourth light portion and the XOR function digital optical output.

\* \* \* \* \*